(12) United States Patent
Ichieda et al.

(10) Patent No.: US 12,193,084 B2
(45) Date of Patent: Jan. 7, 2025

(54) COMMUNICATION CONNECTION METHOD, INFORMATION PROCESSING DEVICE, AND COMMUNICATION CONNECTION SYSTEM

(71) Applicant: SEIKO EPSON CORPORATION, Tokyo (JP)

(72) Inventors: Hiroyuki Ichieda, Matsumoto (JP); Kota Takeuchi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 343 days.

(21) Appl. No.: 17/704,916

(22) Filed: Mar. 25, 2022

(65) Prior Publication Data
US 2022/0312514 A1    Sep. 29, 2022

(30) Foreign Application Priority Data
Mar. 26, 2021    (JP) .................. 2021-052916

(51) Int. Cl.
*H04W 76/14*  (2018.01)
*G06K 19/06*  (2006.01)

(52) U.S. Cl.
CPC ...... *H04W 76/14* (2018.02); *G06K 19/06037* (2013.01)

(58) Field of Classification Search
None
See application file for complete search history.

(56) References Cited

U.S. PATENT DOCUMENTS

| | | |
|---|---|---|
| 2008/0039063 A1 | 2/2008 | Ichieda |
| 2008/0074560 A1 | 3/2008 | Ichieda |
| 2013/0021223 A1 | 1/2013 | Ichieda |
| 2017/0026900 A1* | 1/2017 | Goto ................... G06F 16/381 |
| 2018/0054601 A1 | 2/2018 | Tomono |
| 2018/0091365 A1* | 3/2018 | Nakajima .......... H04L 41/0803 |
| 2018/0249515 A1* | 8/2018 | Li ........................ H04W 76/10 |
| 2019/0364380 A1* | 11/2019 | Khawand ............... H04W 4/02 |

FOREIGN PATENT DOCUMENTS

| | | |
|---|---|---|
| CN | 112203301 A | 1/2021 |
| JP | 2007-312179 A | 11/2007 |
| JP | 2008-077380 A | 4/2008 |
| JP | 2009-284390 A | 12/2009 |
| JP | 2015-154130 A | 8/2015 |
| JP | 2016-181824 A | 10/2016 |
| JP | 2017-116689 A | 6/2017 |

* cited by examiner

*Primary Examiner* — Adnan Baig
(74) *Attorney, Agent, or Firm* — Oliff PLC

(57) ABSTRACT

A communication connection method includes acquiring, by an information processing device, a first image displayed by a first display device, the first image representing first connection information for connection via a first communication path, acquiring, by the information processing device, a second image displayed by a second display device, the second image representing second connection information for connection via a second communication path, and executing communication connection between the information processing device, the first display device, and the second display device based on the first image and the second image.

13 Claims, 12 Drawing Sheets

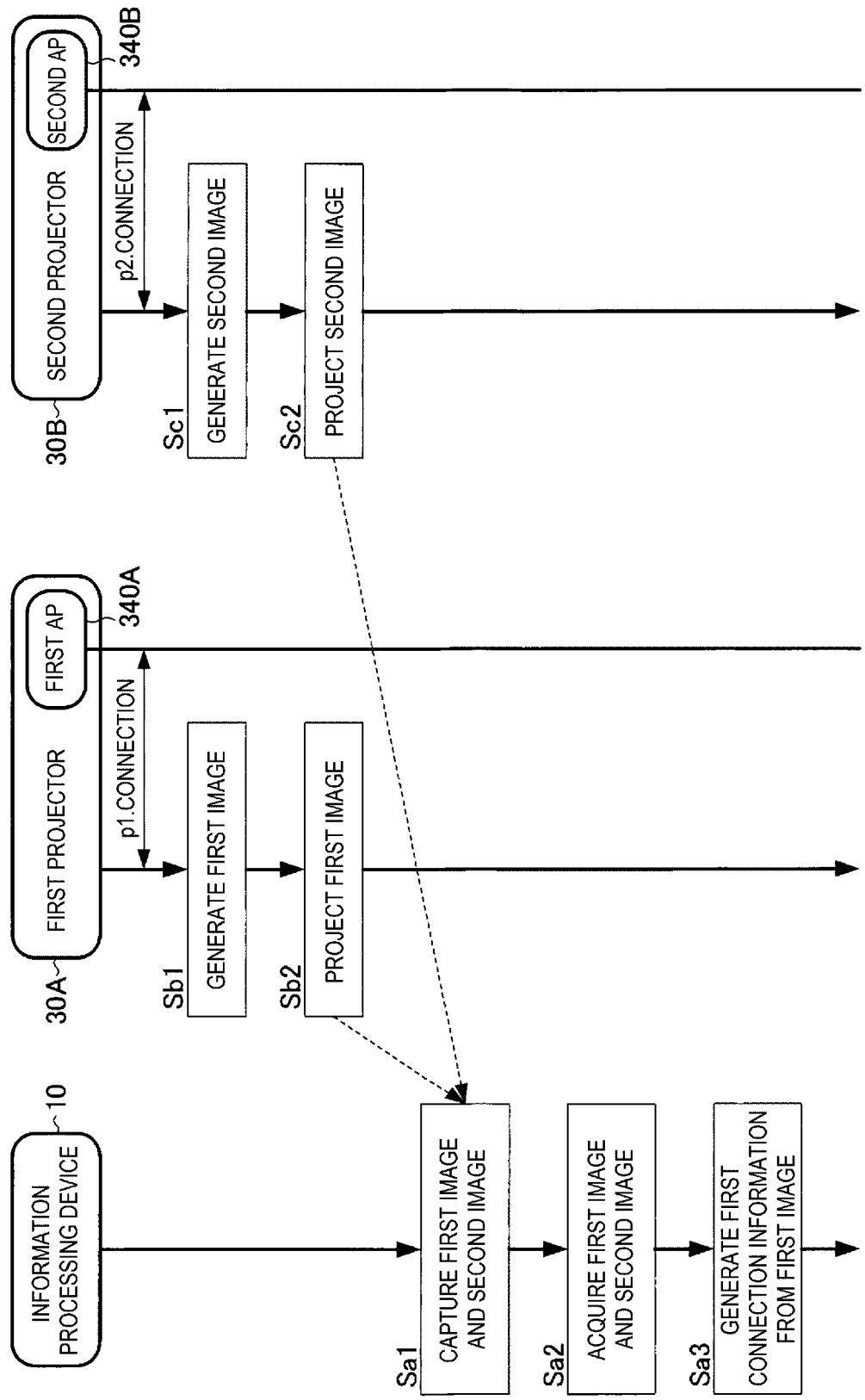

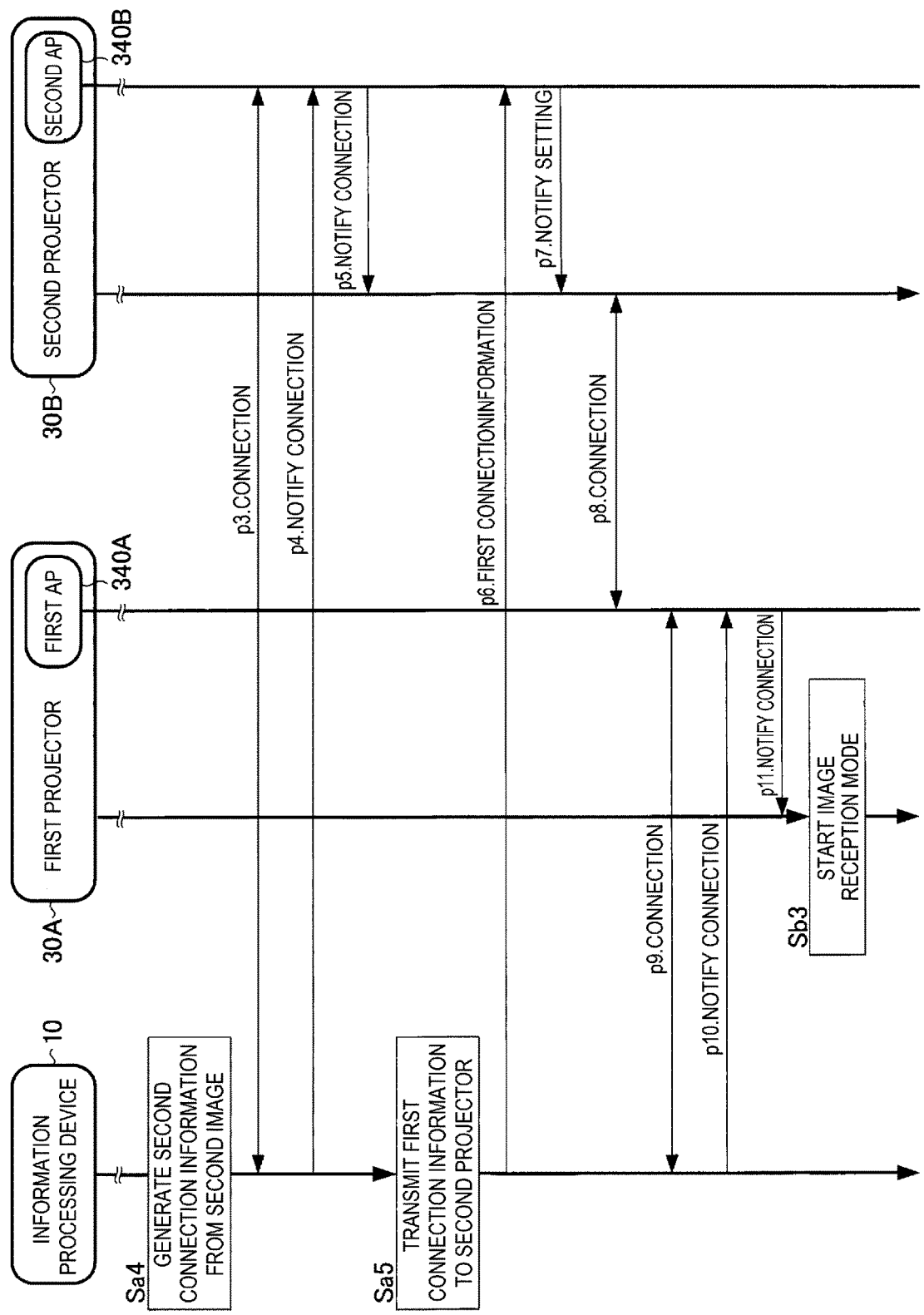

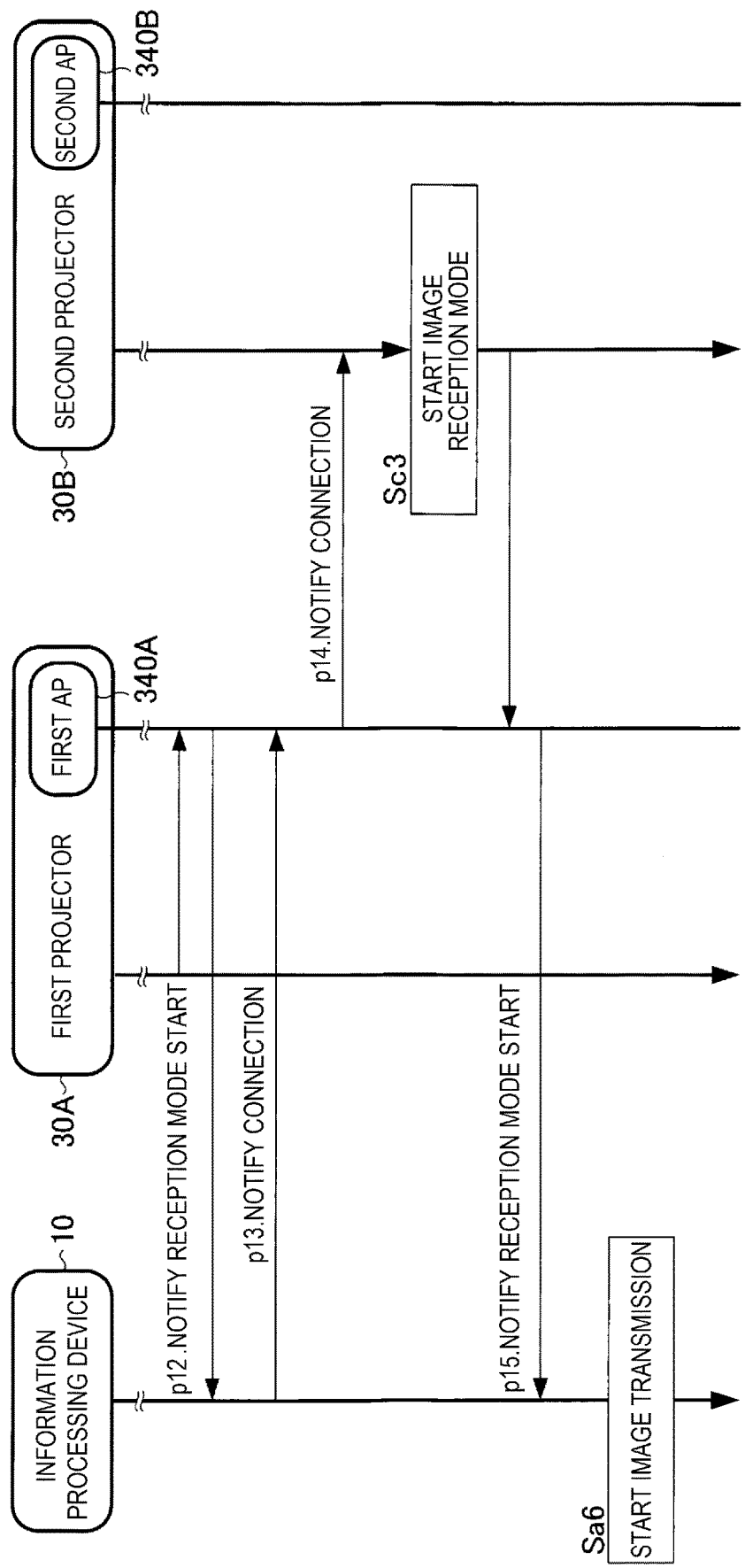

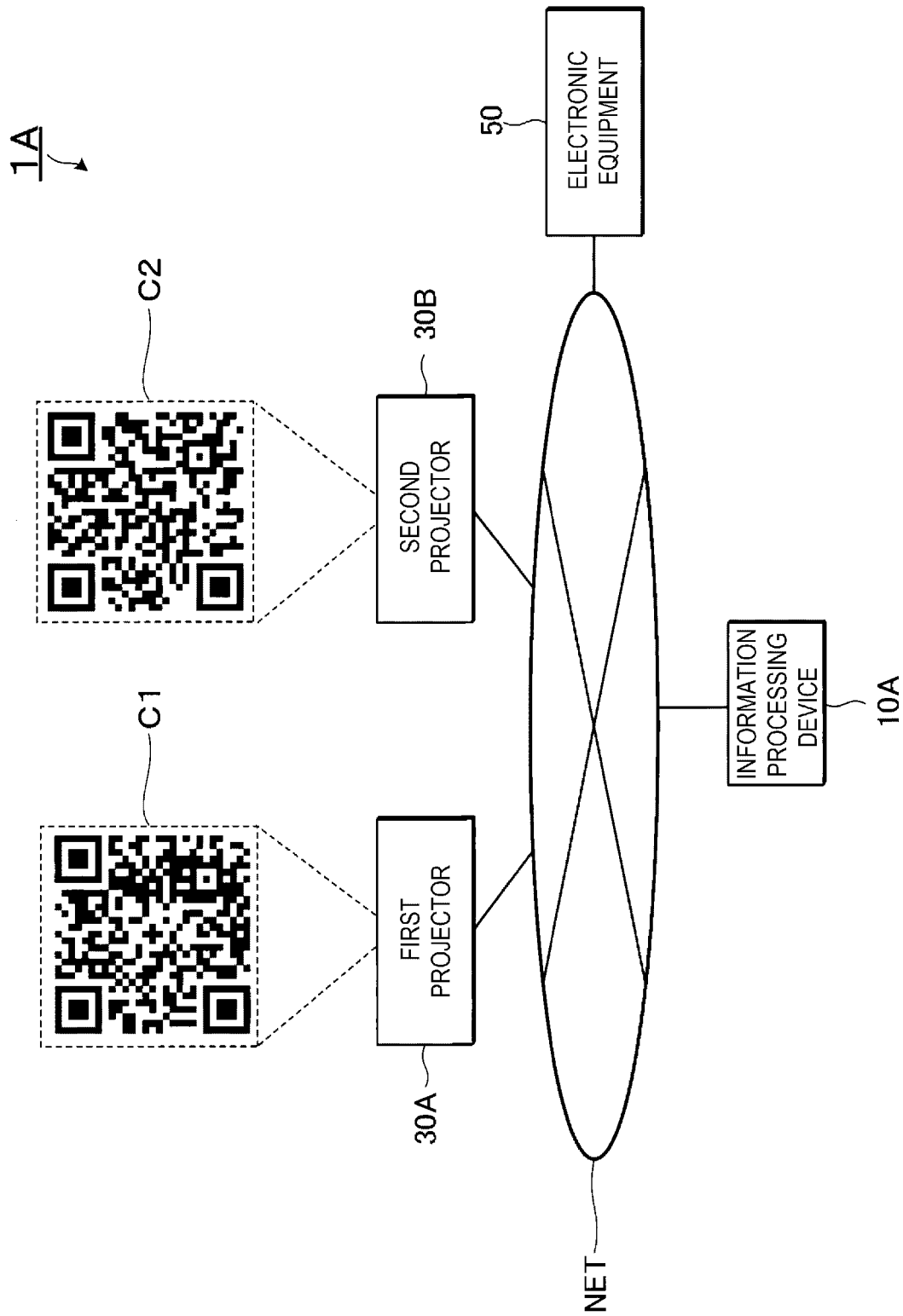

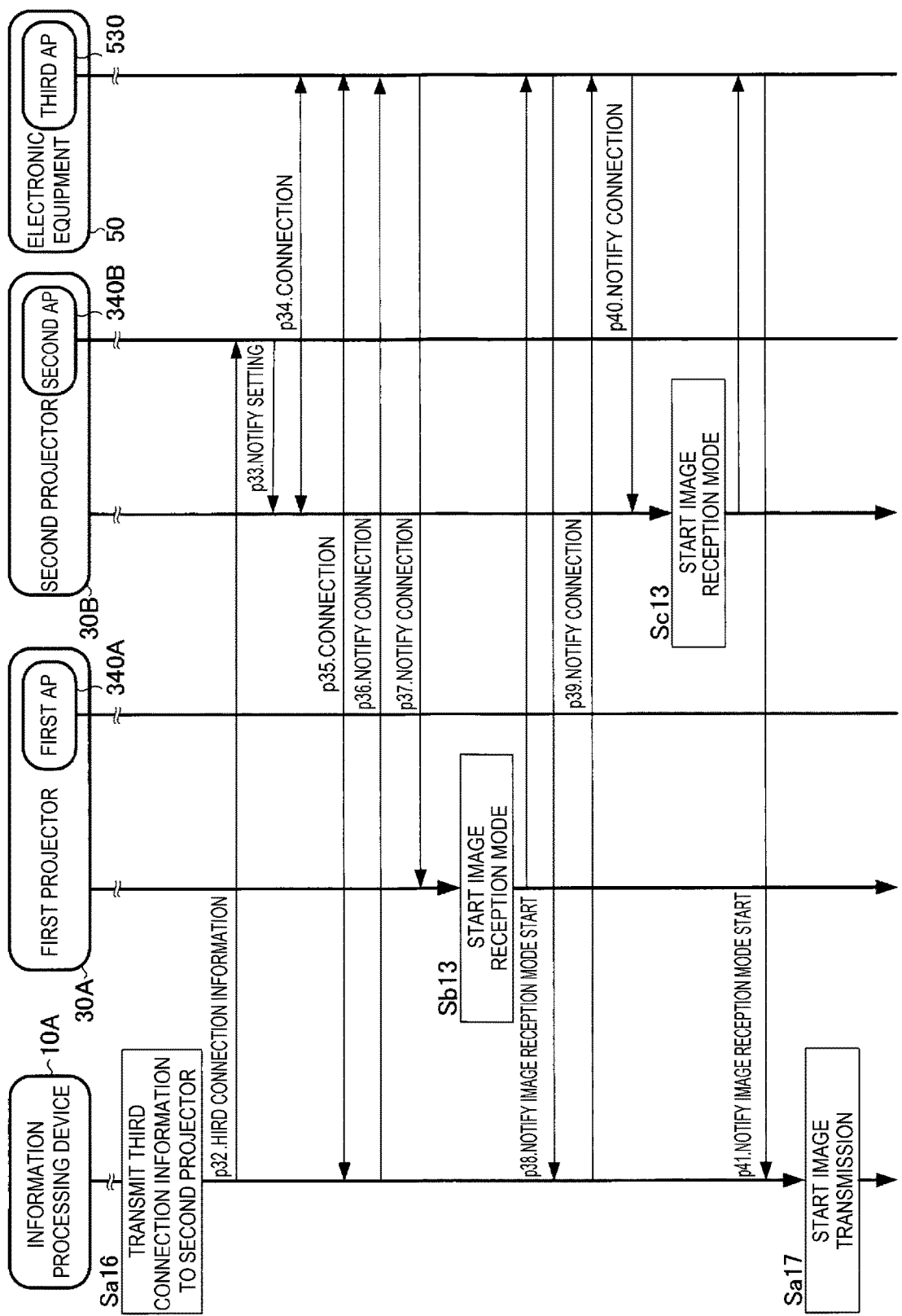

COMMUNICATION CONNECTION METHOD, INFORMATION PROCESSING DEVICE, AND COMMUNICATION CONNECTION SYSTEM

The present application is based on, and claims priority from JP Application Serial Number 2021-052916, filed Mar. 26, 2021, the disclosure of which is hereby incorporated by reference herein in its entirety.

BACKGROUND

1. Technical Field

The present disclosure relates to a communication connection method, an information processing device, and a communication connection system.

2. Related Art

There has been a technique for automatically connecting electronic equipment to a network by using a wireless communication function.

For example, JP-A-2015-154130 (Patent Literature 1) describes a method of performing network connection to a PC (Personal Computer), the method automatically executing P2P (Peer to Peer) communication by Ad-hoc communication first and, at the time of the P2P communication functioning as temporary connection, transmitting a setting value for performing infrastructure communication through an access point functioning as regular connection. The setting value for the network connection had to be manually input in the past. However, the method of Patent Literature 1 has made it possible to automatically set the setting of the network connection.

However, the technique disclosed in Patent Literature 1 considers only a situation in which one device is connected to the PC and cannot cope with a case in which there are a plurality of devices desired to be connected to the PC.

SUMMARY

A communication connection method according to an aspect of the present disclosure is a communication connection method for connecting an information processing device and a first display device and a second display device, the communication connection method including: the information processing device acquiring a first image displayed by the first display device and representing first connection information necessary for connection via a first communication path; the information processing device acquiring a second image displayed by the second display device and representing second connection information necessary for connection via a second communication path; and causing the information processing device, the first display device, and the second display device to execute communication connection based on the first image and the second image.

An information processing device according to an aspect of the present disclosure is an information processing device including: a first image acquiring section configured to acquire a first image displayed by a first display device and representing first connection information necessary for connection via a first communication path; and a second image acquiring section configured to acquire a second image displayed by a second display device and representing second connection information necessary for connection via a second communication path, wherein the information processing device causes the first display device and the second display device to execute communication connection to the information processing device based on the first image and the second image.

A communication connection system according to an aspect of the present disclosure is a communication connection system including: a first display device configured to display a first image representing first connection information necessary for connection via a first communication path; a second display device configured to display a second image representing second connection information necessary for connection via a second communication path; and an information processing device configured to acquire the first image and the second image, wherein the communication connection system causes the information processing device, the first display device, and the second display device to execute communication connection based on the first image and the second image.

BRIEF DESCRIPTION OF THE DRAWINGS

FIG. 4A is a sequence chart showing an example of the operation of the communication connection system.

FIG. 4B is a sequence chart showing the example of the operation of the communication connection system.

FIG. 4C is a sequence chart showing the example of the operation of the communication connection system.

FIG. 5 is a block diagram showing the configuration of a communication connection system according to a second embodiment.

FIG. 8C is a sequence chart showing the example of the operation of the communication connection system.

DESCRIPTION OF EXEMPLARY EMBODIMENTS

Communication connection methods, information processing devices, and communication connection systems according to embodiments are explained below with reference to the drawings. In the figures, dimensions and scales of sections are differentiated from actual dimensions and scales as appropriate. Since the embodiments explained below are preferred specific examples, technically preferable various limitations are applied to the embodiments. However, the scope of the present disclosure is not limited to the embodiments unless there is a particular description to the effect that the present disclosure is limited in the following explanation.

1. First Embodiment

1-1: Overall Configuration

Figure 1:
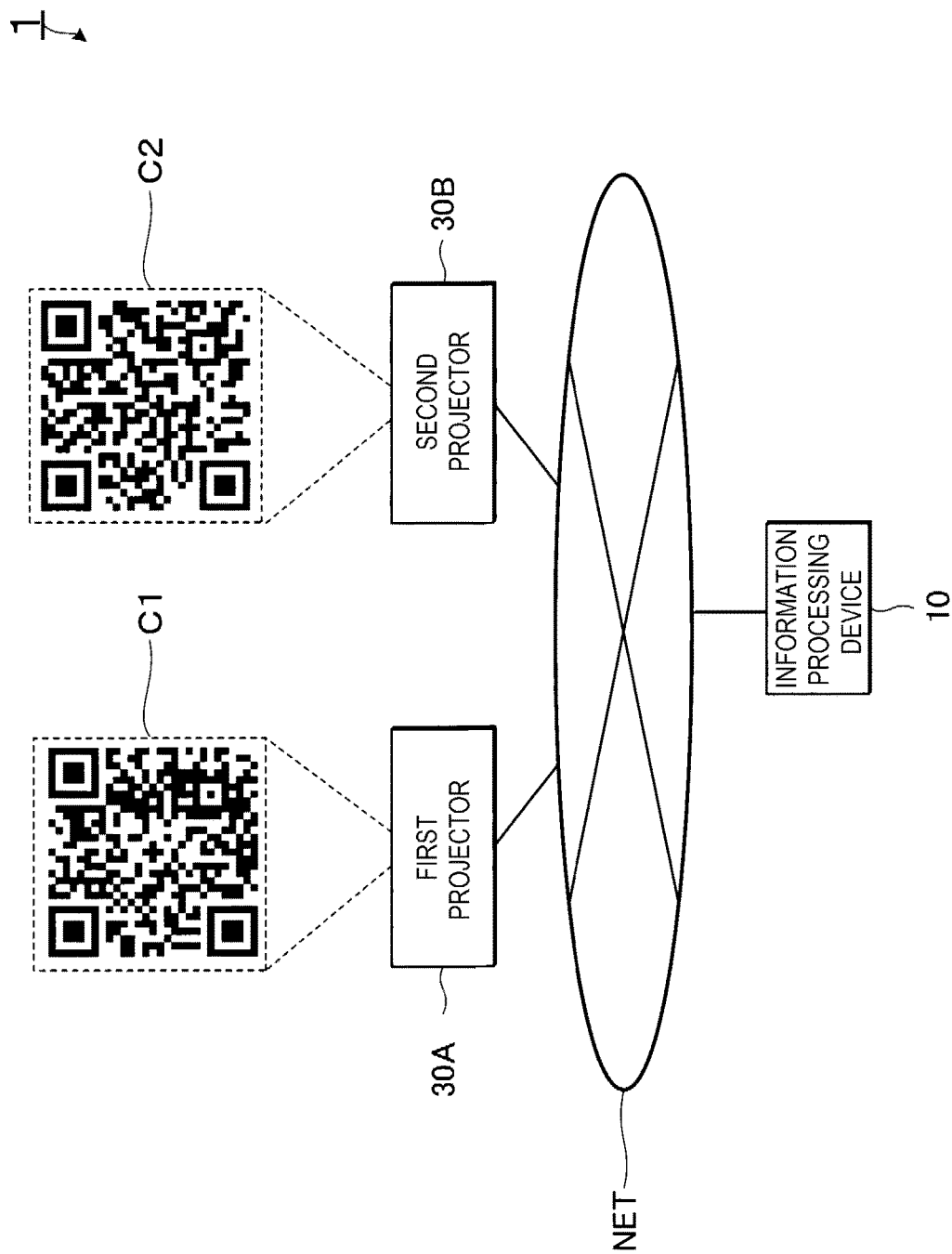
FIG. 1 is a block diagram showing the configuration of a communication connection system according to a first embodiment.

FIG. 1 is a block diagram showing the configuration of a communication connection system 1 according to a first embodiment. The communication connection system 1 automatically executes setting for one-to-many communication connection between one information processing device and a plurality of projectors.

The communication connection system 1 includes projectors that project QR codes onto a plane such as a screen or a wall, more specifically, a first projector 30A that projects a first QR code C1 and a second projector 30B that projects a second QR code C2. The first QR code C1 represents first connection information c1 for connection to the first projector 30A. Similarly, the second QR code C2 represents second connection information c2 for connection to the second projector 30B. In this specification, the first projector 30A is sometimes referred to as "first display device" and the second projector 30B is sometimes referred to as "second display device". "QR code" is a registered trademark.

The first projector 30A and the second projector 30B may set such that projection surfaces thereof projected onto the wall or the screen are separated, may be set such that the projection surfaces are in contact, or may be set such that the projection surfaces overlap. However, the first projector 30A and the second projector 30B are suitably set such that the first QR code C1 and the second QR code C2 do not overlap.

The communication connection system 1 includes an information processing device 10. The information processing device 10 images the first QR code C1 and the second QR code C2 collectively or in order one by one and sets, based on connection information generated based on these QR codes, connection of the information processing device 10 and the first projector 30A and the second projector 30B and mutual connection of the first projector 30A and the second projector 30B. These components are connected to a communication network NET such as the Internet.

In FIG. 1, two projectors, that is, the first projector 30A and the second projector 30B are shown. However, the embodiments are not limited to this. The communication connection system 1 can include any plurality of projectors. The present disclosure adopts a QR code. However, a two-dimensional code other than the QR code may be used. Besides the QR code, an SP code, a CP code, and the like correspond to the two-dimensional code. The present disclosure may adopt a three-dimensional code obtained by changing the two-dimensional code in time-series. The "connection information" described above is any one of or a combination of any two or more of an SSID (Service Set Identifier), an encryption key, security, channel setting, a flag of DHCP (Dynamic Host Configuration Protocol) valid/invalid, an IP address, and a subnet mask. The encryption key is, for example, a security key, a passphrase, a network key, or a password. The security is, for example, WPA2/WPA3-PSK or WPA2/WPA3-EAP. The QR code is generated such that content of the "connection information" described above is embedded in the QR code.

In FIG. 1, the first projector 30A projects the first QR code C1 and the second projector 30B projects the second QR code C2. However, this is an example. The projection by the first projector 30A and the second projector 30B is not limited to this. That is, the first projector 30A projects a first image representing the first connection information c1 and the second projector 30B projects a second image representing the second connection information c2. However, the first image and the second image are not limited to QR codes.

1-2: Configuration of the Information Processing Device

Figure 2:
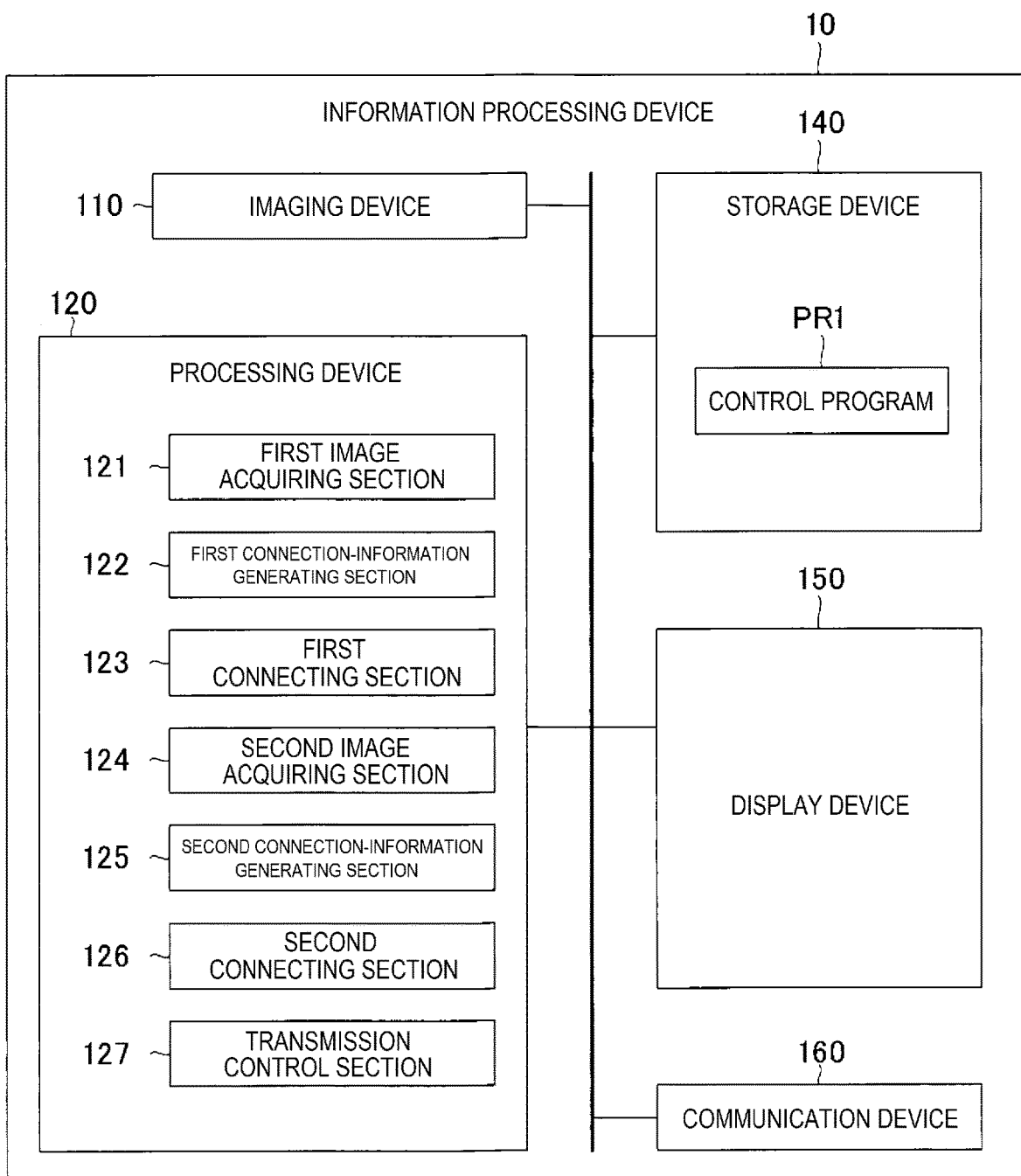
FIG. 2 is a block diagram showing the configuration of an information processing device.

FIG. 2 is a block diagram showing a configuration example of the information processing device 10. The information processing device 10 is typically a PC. However, the information processing device 10 is not limited to this and may be, for example, a tablet terminal or a smartphone. The information processing device 10 includes an imaging device 110, a processing device 120, a storage device 140, a display device 150, and a communication device 160. The components of the information processing device 10 are connected to one another by one or a plurality of buses for communicating information.

The imaging device 110 is a device that captures a first image and a second image. The imaging device 110 captures various images under control by the processing device 120. For example, cameras included in the PC, the tablet terminal, and the smartphone are suitably used as the imaging device 110. However, the imaging device 110 is not limited to this and may be an external camera such as a WEB camera.

When the first image and the second image are QR codes, a user of the information processing device 10 starts, for example, an application in the information processing device 10 and presses a not-shown QR code connection button to thereby execute imaging using the imaging device 110 via a QR code photographing screen of the information processing device 10.

The processing device 120 is at least one processor that controls the entire information processing device 10. The processing device 120 is configured by, for example, one or a plurality of chips. The processing device 120 is configured by a central processing unit (CPU) including, for example, an interface with peripheral devices, an arithmetic operation device, and a register. A part or all of functions of the processing device 120 may be realized by hardware such as a DSP (Digital Signal Processor), an ASIC (Application Specific Integrated Circuit), a PLD (Programmable Logic Device), or an FPGA (Field Programmable Gate Array). The processing device 120 executes various kinds of processing in parallel or sequentially.

The storage device 140 is a recording medium readable and writable by the processing device 120 and stores a plurality of programs including a control program PR1 to be executed by the processing device 120, the first connection information c1 for connection to the first projector 30A, and the second connection information c2 for connection to the second projector 30B. As explained in detail below, the first connection information c1 is generated based on the first image by a first connection-information generating section 122 included in the processing device 120 and is stored in the storage device 140. The second connection information c2 is generated based on the second image by a second connection-information generating section 125 included in the processing device 120 and is stored in the storage device 140. In principle, the first connection information c1 and the second connection information c2 are not stored in the storage device 140 at an operation start time of the communication connection system 1. Therefore, the first connection information c1 and the second connection information c2 are not shown in FIG. 2. The storage device 140 stores images to be projected as multi projection by the first projector 30A and the second projector 30B. Further, the storage device 140 stores layout information relating to disposition of the first projector 30A and the second projector 30B. The storage device 140 may be configured by at least one of, for example, a ROM (Read Only Memory), an EPROM (Erasable Programmable ROM), an EEPROM (Electrically Erasable Programmable ROM), and a RAM (Random Access Memory). The storage device 140 may be called register, cache, main memory, main storage device, or the like.

The display device 150 is a device that displays an image and character information. The display device 150 displays various images under the control by the processing device 120. For example, various display panels such as a liquid crystal display panel and an organic EL (Electro Luminescence) display panel are suitably used as the display device 150.

The communication device 160 is hardware functioning as a transmission and reception device for performing communication with other devices. The communication device 160 is called, for example, network device, network controller, network card, and communication module as well. The communication device 160 includes a connector for wired connection and may include an interface circuit corresponding to the connector. The communication device 160 may include a wireless communication interface. Examples of the connector for wired connection and the interface circuit include connectors and interface circuits conforming to a wireless LAN, IEEE1394, and a USB. Examples of the wireless communication interface include wireless communication interfaces conforming to a wireless LAN, Bluetooth (registered trademark), and the like.

The processing device 120 reads out the control program PR1 from the storage device 140 and executes the control program PR1 to thereby function as a first image acquiring section 121, a first connection-information generating section 122, a first connecting section 123, a second image acquiring section 124, a second connection-information generating section 125, a second connecting section 126, and a transmission control section 127. The control program PR1 may be transmitted, via the communication network NET, from another device such as a server that manages the information processing device 10.

The first image acquiring section 121 acquires a first image representing the first connection information c1. The first image is projected from the first projector 30A. The first connection information c1 is information necessary for connection by a first communication path passing through a first access point 340A included in the first projector 30A explained below. For example, the first image acquiring section 121 acquires, as the first image representing the first connection information c1, a first QR code C1 imaged by the imaging device 110. The first communication path indicates, for example, a path passing through the first access point 340A from the information processing device 10 and connected to a processing device 320A included in the first projector 30A explained below and a path passing through the first access point 340A from the information processing device 10 and connected to a processing device 320B included in the second projector 30B explained below.

The first connection-information generating section 122 generates the first connection information c1 based on the first image. For example, the first connection-information generating section 122 generates the first connection information c1 based on the first QR code C1 acquired by the first image acquiring section 121.

The first connecting section 123 is connected to the first projector 30A via the first communication path based on the first connection information c1. Specifically, the first connecting section 123 is connected to the first projector 30A via the first communication path, which passes through the first projector 30A, based on the first connection information c1 generated by the first connection-information generating section 122.

The second image acquiring section 124 acquires a second image representing the second connection information c2. The second image is projected from the second projector 30B. The second connection information c2 is information necessary for connection by a second communication path passing through a second access point 340B included in the second projector 30B explained below. For example, the second image acquiring section 124 acquires, as the second image representing the second connection information c2, a second QR code C2 imaged by the imaging device 110. The second communication path indicates a path passing through the second access point 340B from the information processing device 10 and connected to the processing device 320B included in the second projector 30B.

The second connection-information generating section 125 generates the second connection information c2 based on the second image. For example, the second connection-information generating section 125 generates the second connection information c2 based on the second QR code C2 acquired by the second image acquiring section 124.

The second connecting section 126 is connected to the second projector 30B via the second communication path based on the second connection information c2. Specifically, the second connecting section 126 is connected to the second projector 30B via the second communication path, which passes through the second projector 30B, based on the second connection information c2 generated by the second connection-information generating section 125.

While the information processing device 10 is connected to the second projector 30B via the second communication path, the transmission control section 127 transmits the first connection information c1 to the second projector 30B with the communication device 160 to thereby cause the second projector 30B to execute connection to the first projector 30A through the first access point 340A by using the first connection information c1. The second projector 30B receives the first connection information c1 from the information processing device 10 to thereby become connectable to the first projector 30A through the first access point 340A based on the first connection information c1.

1-3. Configuration of the Projector

Figure 3:
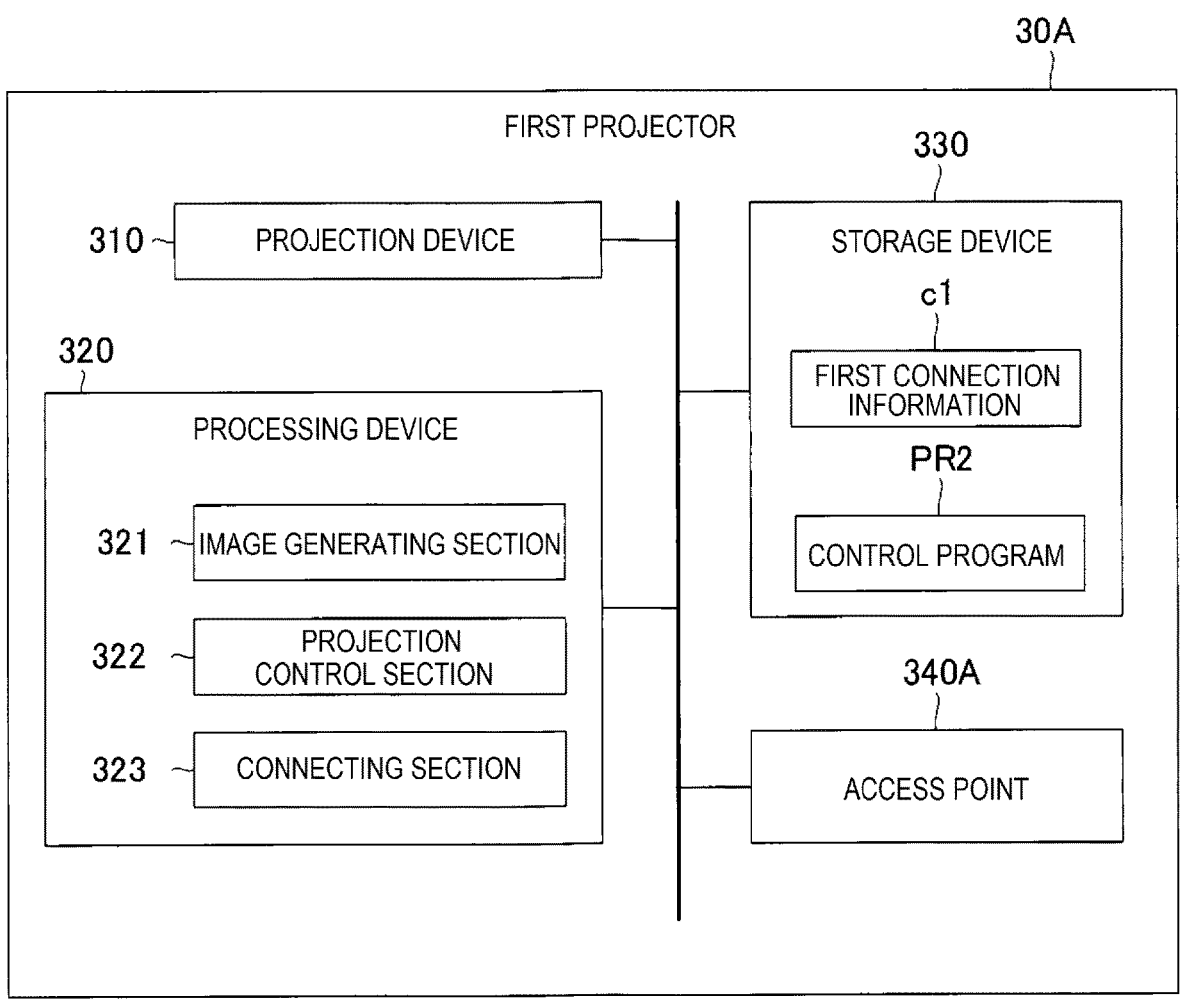
FIG. 3 is a block diagram showing the configuration of a first projector.

FIG. 3 is a block diagram showing the configuration of the first projector 30A. The first projector 30A includes a projection device 310, a processing device 320, a storage device 330, and an access point 340A. The components of the first projector 30A are connected to one another by one or a plurality of buses for communicating information. The components of the first projector 30A are configured by one or a plurality of kinds of equipment. Apart of the components of the first projector 30A may be omitted. Illustration is omitted about the second projector 30B because the second projector 30B is configured the same as the first projector 30A. The second projector 30B includes, instead of the access point 340A, an access point 340B corresponding to the access point 340A. The access point 340A and the access point 340B are collectively referred to as "access point 340" according to necessity. In the following explanation, the access point 340A is sometimes referred to as "first access point 340A" and the access point 340B is sometimes referred to as "second access point 340B".

The projection device 310 is a device that projects an image generated by an image generating section 321 explained below onto a screen, a wall, or the like. The image includes the first QR code C1, which is the first image. The projection device 310 projects various images under control by the processing device 320. The projection device 310 includes, for example, a light source, a liquid crystal panel, and a projection lens, modulates light from the light source using the liquid crystal panel, and projects the modulated light onto the screen, the wall, or the like via the projection lens.

The processing device 320 is a processor that controls the entire first projector 30A and is configured by, for example, one or a plurality of chips. The processing device 320 is configured by a central processing unit (CPU) including, for example, an interface with peripheral devices, an arithmetic operation device, and a register. A part or all of functions of the processing device 320 may be realized by hardware such as a DSP (Digital Signal Processor), an ASIC (Application Specific Integrated Circuit), a PLD (Programmable Logic Device), or an FPGA (Field Programmable Gate Array). The processing device 320 executes various kinds of processing in parallel or sequentially.

The storage device 330 is a recording medium readable by the processing device 320 and stores a plurality of programs including a control program PR2 to be executed by the processing device 320 and the first connection information c1 for connecting the other devices and the first projector 30A. The storage device 330 may be configured by at least one of, for example, a ROM (Read Only Memory), an EPROM (Erasable Programmable ROM), an EEPROM (Electrically Erasable Programmable ROM), and a RAM (Random Access Memory). The storage device 330 may be called register, cache, main memory, main storage device, or the like.

The access point 340 is a communication device for connecting the first projector 30A functioning as a wireless LAN client to the communication network NET itself or to the other equipment via the communication network NET using a wireless LAN standard such as Wi-Fi. The access point 340 includes a wireless interface circuit conforming to, for example, a wireless LAN. Wi-Fi is a registered trademark.

The processing device 320 reads out the control program PR2 from the storage device 330 and executes the control program PR2 to thereby function as an image generating section 321, a projection control section 322, and a connecting section 323. The control program PR2 may be transmitted, via the communication network NET, from another device such as a server that manages the first projector 30A.

The image generating section 321 generates a first image stored in the storage device 330 and representing the first connection information c1. The first image is, for example, the first QR code C1.

The projection control section 322 causes the projection device 310 to project the first image generated by the image generating section 321 onto a wall, a screen, or the like. Specifically, a user of the first projector 30A operates a not-shown operation section such as a button or a remote controller included in the first projector 30A to thereby select a multiprojection mode. When the multiprojection mode is selected by the user, the projection control section 322 causes the projection device 310 to project the first image onto the wall or the screen. The projection control section 322 controls projection of an image received from the information processing device 10 and projected by the first projector 30A. The first image is, for example, the first QR code C1. The first projector 30A projecting the first QR code C1 is an example of the first display device in the present disclosure displaying the first image. The projection control section 322 may cause the projection device 310 to project the first image onto the wall or the screen not when the multi projection mode is selected as explained above but when a video input source is switched to a LAN source for receiving a projected image through a network.

The connecting section 323 controls a communication device 350 to thereby be connected to the information processing device 10 and the second projector 30B through the access point 340 based on the first connection information c1 stored in the storage device 330.

Illustration is omitted about the configuration of the second projector 30B. This is because the second projector 30B has the same configuration as the configuration of the first projector 30A except that the second projector 30B is different from the first projector 30A in that the second projector 30B has the second connection information c2 instead of the first connection information c1 at a use start time and has both of the first connection information c1 and the second connection information c2 after the second projector 30B receives the first connection information c1 from the information processing device 10 and in that the second projector 30B includes a configuration that generates the second image representing the second connection information c2 and projects the generated second image onto a wall or a screen. The second image is, for example, the second QR code C2. The second projector 30B projecting the second QR code C2 is an example of the second display device in the present disclosure displaying the second image.

1-4: Operation of the Communication Connection System 1

The operation of the communication connection system 1 is explained. FIGS. 4A to 4C are sequence charts showing an example of the operation of the communication connection system 1.

As a premise of an operation start, it is assumed that, in the first projector 30A, connection of the processing device 320A, which is the processing device 320 in the first projector 30A, and the first access point 340A is established (p1). Similarly, it is assumed that, in the second projector 30B, connection of the processing device 320B, which is the processing device 320 in the second projector 30B, and the second access point 340B is established (p2).

First, an image generating section 321A, which is the image generating section 321 in the first projector 30A, generates a first image based on the first connection information c1 (step Sb1) and a projection control section 322A, which is the projection control section 322 in the first projector 30A, causes a projection device 310A, which is the projection device 310 in the first projector 30A, to project the first image onto a wall, a screen, or the like (step Sb2). In parallel to this, an image generating section 321B, which is the image generating section 321 in the second projector 30B, generates a second image based on the second connection information c2 (step Sc1) and a projection control section 322B, which is the projection control section 322 in the second projector 30B, causes a projection device 310B, which is the projection device 310 in the second projector 30B, to project the second image onto the wall, the screen, or the like (step Sc2). Step Sb2 only has to be executed later than step Sb1. Step Sc2 only has to be executed later than step Sc1. Execution order of a set of step Sb1 and step Sb2 and a set of step Sc1 and step Sc2 may be any order.

Subsequently, the imaging device 110 of the information processing device 10 captures a first image and a second image based on operation of the user (step Sa1). At this time, the imaging device 110 may capture the first image and the second image one by one or may collectively capture the first image and the second image.

The first image acquiring section 121 of the information processing device 10 acquires the first image captured by the imaging device 110 and the second image acquiring section 124 of the information processing device 10 acquires the second image captured by the imaging device 110 (step Sa2).

The first connection-information generating section 122 of the information processing device 10 generates the first connection information c1 based on the first image and stores the generated first connection information c1 in the storage device 140 (step Sa3). The second connection-information generating section 125 generates the second connection information c2 from the second image and stores the generated second information c2 in the storage device 140 (step Sa4). Consequently, the second connecting section 126 establishes connection to the second access point 340B using the second connection information c2 (p3). In response to the establishment of the connection, the application of the information processing device 10 notifies the second access point 340B that the connection is established (p4). The second access point 340B notifies an application of the second projector 30B that the connection is established (p5). At this time, an IP address of the information processing device 10 is desirably automatically set by a DHCP function of the second access point 340B. The IP address may be set to be in the same network group without using the DHCP function.

The transmission control section 127 of the information processing device 10 causes the communication device 160 to transmit the first connection information c1 to the second projector 30B (step Sa5). In response to the transmission of the first connection information c1, the second access point 340B receives the first connection information c1 (p6). The second access point 340B notifies the application of the second projector 30B that the first connection information c1 is set in the second projector 30B (p7). Consequently, connection between the second projector 30B and the first access point 340A is established (p8).

As explained above, in step Sa3, the information processing device 10 generates the first connection information c1 and stores the first connection information c1 in the storage device 140. Consequently, the first connecting section 123 establishes connection to the first access point 340A using the first connection information c1 (p9). In response to the establishment of the connection, the application of the information processing device 10 notifies the first access point 340A that the connection is established (p10). The first access point 340A notifies an application of the first projector 30A that the connection is established (p11). Consequently, the first projector 30A starts an image reception mode (step Sb3). According to the start of the image reception mode, the first projector 30A notifies, through the first access point 340A, the information processing device 10 that the image reception mode is started (p12). The application of the information processing device 10 notifies the first access point 340A that connection to the second projector 30B through the first access point 340A is established (p13). The first access point 340A notifies the application of the second projector 30B that the connection is established (p14). Consequently, the second projector 30B starts the image reception mode (step Sc3). According to the start of the image reception mode, the second projector 30B notifies, through the first access point 340A, the information processing device 10 that the image reception mode is started (p15). The order of the start of the image reception mode in the first projector 30A and the start of the image reception mode in the second projector 30B may be any order. The notification of the image reception mode from the second projector 30B to the information processing device 10 may be executed through the second access point 340B instead of the first access point 340A.

Finally, the transmission control section 127 of the information processing device 10 causes the communication device 160 to start transmission of an image stored in the storage device 140 to the first access point 340A. Consequently, an image to be displayed in the first projector 30A is transmitted from the information processing device 10 to the processing device 320A of the first projector 30A through the first access point 340A. An image to be displayed in the second projector 30B is transmitted from the information processing device 10 to the processing device 320B of the second projector 30B through the access point 340.

In the operation of the communication connection system 1 explained above, at a multi projection time, the information processing device 10 transmits an image to be projected by the first projector 30A to the first projector 30A through the first access point 340A and transmits an image to be projected by the second projector 30B to the second projector 30B through the first access point 340A. That is, in a state in which connection of the information processing device 10, the first projector 30A, and the second projector 30B is completed through the first access point 340A, the first access point 340A included in the first projector 30A is a master unit and the second access point 340B included in the second projector 30B is a slave unit. The information processing device 10 may select, according to the order of the acquisition of the first image and the second image, in other words, the order of the capturing of the first image and the second image, which of the first access point 340A and the second access point 340B of the first projector 30A is set as the master unit to use the access point, in other words, which of the first communication path and the second communication path is used may be selected. For example, when the first image is captured earlier than the second image, the first access point 340A may be set as the master unit, the second access point 340B may be set as the slave unit, and the first information processing device 10, the first projector 30A, and the second projector 30B may be connected through the first access point 340A. Alternatively, the information processing device 10 may select, according to the order of the extraction of the first connection information c1 and the second connection information c2, which of the first access point 340A and the second access point 340B of the first projector 30A is set as the master unit to use the access point. For example, when the first connection information c1 is extracted earlier than the second connection information c2, the first access point 340A may be set as the master unit and the second access point 340B may be set as the slave unit. Alternatively, the information processing device 10 may select, according to operation of the user on the information processing device 10, which of the first access point 340A and the second access point 340B of the first projector 30A is set as the master unit to use the access point. For example, when the user is caused to select on the application of the information processing device 10 which of the first access point 340A and the second access point 340B is used as the master unit and the first access point 340A is selected to be used as the master unit, the first access point 340A may be set as the master unit and the second access point 340B may be set as the slave unit. Alternatively, the information processing device 10 may select, according to model information of the first projector 30A and the second projector 30B, in particular, model information linked to the performances of the projectors, which of the first access point 340A and the second access point 340B of the first projector 30A is set as the master unit to use the access point. For example, when the performance of the first projector 30A indicated by the model information is more excellent than the performance of the second projector 30B indicated by the model information, the first access point 340A may be set as the master unit and the second access point 340B may be set as the slave unit. Alternatively, the information processing device 10 may select, based on the acquired first QR code C1, which is the first image, and the acquired second QR code C2, which is the second image, which of the first access point 340A and the second access point 340B of the first projector 30A is set as the master unit to use the access point. For example, by causing the first projector 30A to project the first QR code C1 including the model information indicating the performance of the first projector 30A and the first connection information c1, causing the second projector 30B to project the second QR code C2 including the model information indicating the performance of the second projector 30B and the second connection information c2, and acquiring the first QR code C1 and the second QR code C2 with the information processing device 10, it is possible to acquire the model information of the first projector 30A and the second projector 30B. In this case, when the performance of the first projector 30A indicated by the model information is more excellent than the performance of the second projector 30B indicated by the model information, the first access point 340A may be set as the master unit and the second access point 340B may be set as the slave unit. Information included in the first QR code C1 and the second QR code C2 is not limited to the model information. Information for determining which of the projectors is set as the master unit may be included in the first QR code C1 and the second QR code C2. The information processing device 10 may select, based on the first QR code C1 and the second QR code C2, which of the first access point 340A and the second access point 340B of the first projector 30A is set as the master unit to use the access point.

As explained above, according to this embodiment, there is provided a communication connection method for connecting the information processing device 10 and the first projector 30A and the second projector 30B, the communication connection method including the information processing device 10 acquiring a first image projected from the first projector 30A and including the first connection information c1 necessary for connection via a first communication path, the information processing device 10 acquiring a second image projected from the second projector 30B and including the second connection information c2 necessary for connection via a second communication path, and causing the information processing device 10, the first projector 30A, and the second projector 30B to execute connection based on the acquired first image and the acquired second image.

Further, there is provided a communication connection method including the information processing device 10 extracting first connection information c1 from a first image, the information processing device 10 being connected to the first projector 30A via a first communication path based on the first connection information c1, the information processing device 10 extracting second connection information c2 from a second image, the information processing device 10 being connected to the second projector 30B via a second communication path based on the second connection information c2, and, while being connected to the second projector 30B via the second communication path, the transmission processing device 10 transmitting the first connection information c1 to thereby cause the second projector 30B to execute connection to the first projector 30A by using the first connection information c1.

By projecting the first image representing the first connection information c1, the first projector 30A is capable of communicating the first connection information c1 to the information processing device 10 even if communication with the information processing device 10 is not established.

Similarly, by projecting the second image representing the second connection information c2, the second projector 30B is capable of communicating the second connection information c2 to the information processing device 10 even if communication with the information processing device 10 is not established. Further, the information processing device 10 can establish communication with the second projector 30B using the second connection information c2 generated based on the second image. In a period in which the information processing device 10 is connected to the second projector 30B, the information processing device 10 transmits the first connection information c1 to the second projector 30B to thereby cause the second projector 30B to execute connection to the first projector 30A.

Therefore, even in a state in which communication with the second projector 30B is not established, the information processing device 10 can transmit various kinds of information to the second projector 30B through the first projector 30A.

Accordingly, it is possible to automatically and easily execute connection of one information processing device and a plurality of display devices. Convenience of the user is improved.

2. Second Embodiment 2-1: Overall Configuration

FIG. 5 is a block diagram showing the configuration of a communication connection system 1A according to a second embodiment. Like the communication connection system 1 according to the first embodiment, the communication connection system 1A automatically executes setting for one-to-many communication connection of one information processing device 10A and the first projector 30A and the second projector 30B, which are a plurality of projectors. However, the communication connection system 1A further includes electronic equipment 50 in addition to the components included in the communication connection system 1.

The electronic equipment 50 is a communication device functioning as a relay point of mutual communication of the information processing device 10A, the first projector 30A, and the second projector 30B and is realized by a wireless LAN router.

2-2: Configuration of the Information Processing Device

Figure 6:
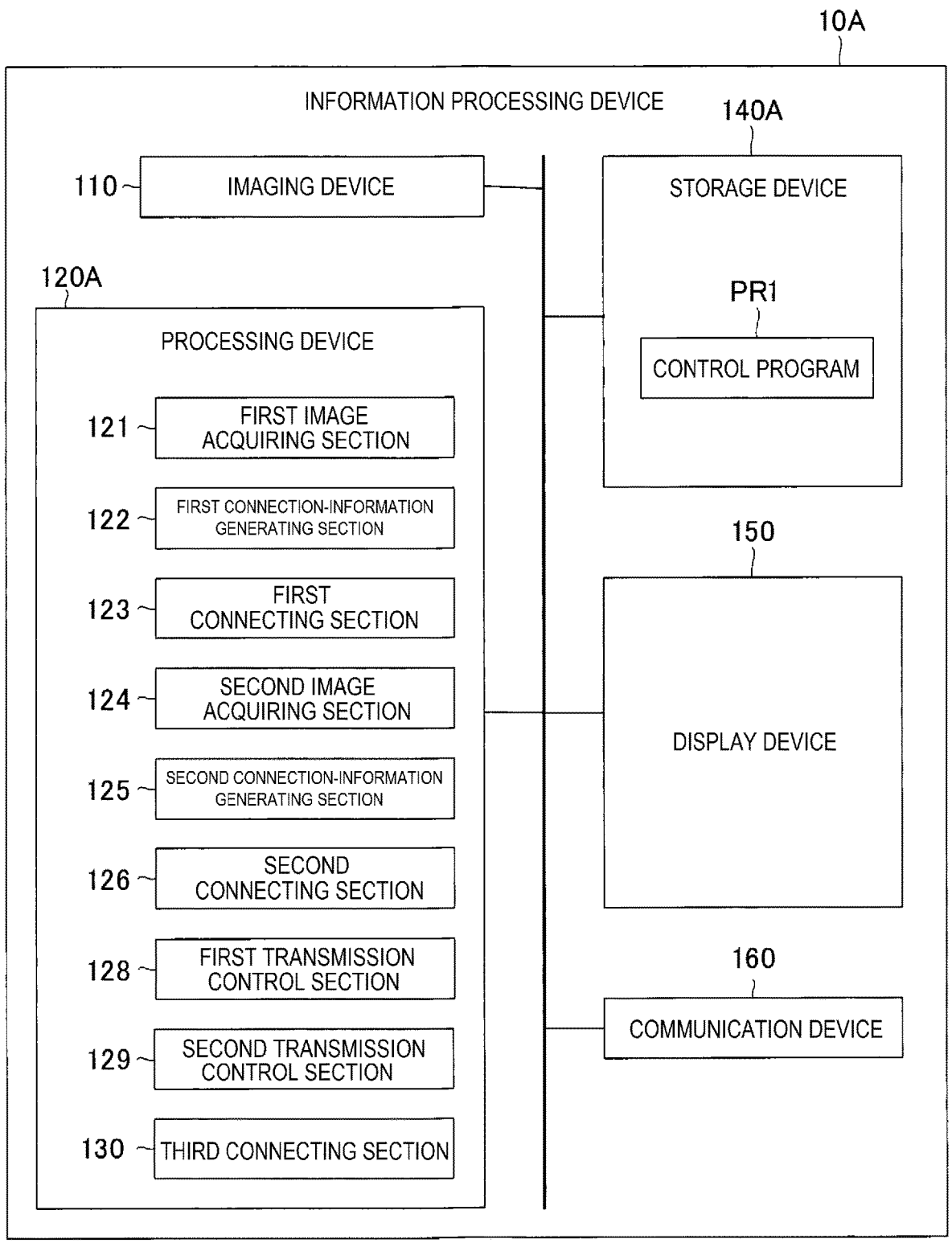
FIG. 6 is a block diagram showing the configuration of an information processing device.

FIG. 6 is a block diagram showing the configuration of the information processing device 10A. In the following explanation, for simplification of explanation, differences of the information processing device 10A from the information processing device 10 are mainly explained. The other components are denoted by the same reference numerals and signs and explanation of the components is omitted.

The information processing device 10A includes a processing device 120A instead of the processing device 120 included in the information processing device 10. The processing device 120A is different from the processing device 120 in that the processing device 120A includes a first transmission control section 128 and a second transmission control section 129 instead of the transmission control section 127 and further includes a third connecting section 130.

While the information processing device 10A is connected to the first projector 30A via a first communication path, the first transmission control section 128 causes the communication device 160 to transmit third connection information c3 to the first projector 30A to thereby cause the first projector 30A to execute connection to the electronic equipment 50 by using the third connection information c3 stored in a storage device 140A as explained below. The first projector 30A receives the third connection information c3 from the information processing device 10A to thereby become connectable to the electronic equipment 50 based on the third connection information c3.

While the information processing device 10A is connected to the second projector 30B via a second communication path, the second transmission control section 129 causes the communication device 160 to transmit the third connection information c3 to the second projector 30B to thereby cause the second projector 30B to execute connection to the electronic equipment 50 by using the third connection information c3. The second projector 30B receives the third connection information c3 from the information processing device 10A to thereby become connectable to the electronic equipment 50 based on the third connection information c3.

The third connecting section 130 is connected to the electronic equipment 50 via a third communication path based on the third connection information c3. Specifically, the third connecting section 130 is connected to the electronic equipment 50 via the third communication path, which passes through an access point 530 included in the electronic equipment 50 explained below, based on the third connection information c3. The third communication path indicates, for example, a path connected from the information processing device 10A to the processing device 320A included in the first projector 30A through the access point 530 and a path connected from the information processing device 10A to the processing device 320B included in the second projector 30B through the access point 530.

The information processing device 10A includes a storage device 140A instead of the storage device 140 included in the information processing device 10. The storage device 140A stores the third connection information c3 for connection to the electronic equipment 50 in addition to the images to be projected by the first projector 30A and the second projector 30B, the layout information relating to the disposition of the first projector 30A and the second projector 30B, the control program PR1, the first connection information c1 for connection to the first projector 30A, and the second connection information c2 for connection to the second projector 30B stored by the storage device 140A. The third connection information c3 may be stored in the storage device 140A from the beginning at a point in time of an operation start of the communication connection system 1A. Alternatively, the information processing device 10A may read a QR code stuck to the electronic equipment 50 or a user of the information processing device 10A may input description content of a sticker stuck to the electronic equipment 50 using a not-shown UI to thereby acquire the third connection information c3 and store the third connection information c3 in the storage device 140A.

2-3: Configuration of the Electronic Equipment

Figure 7:
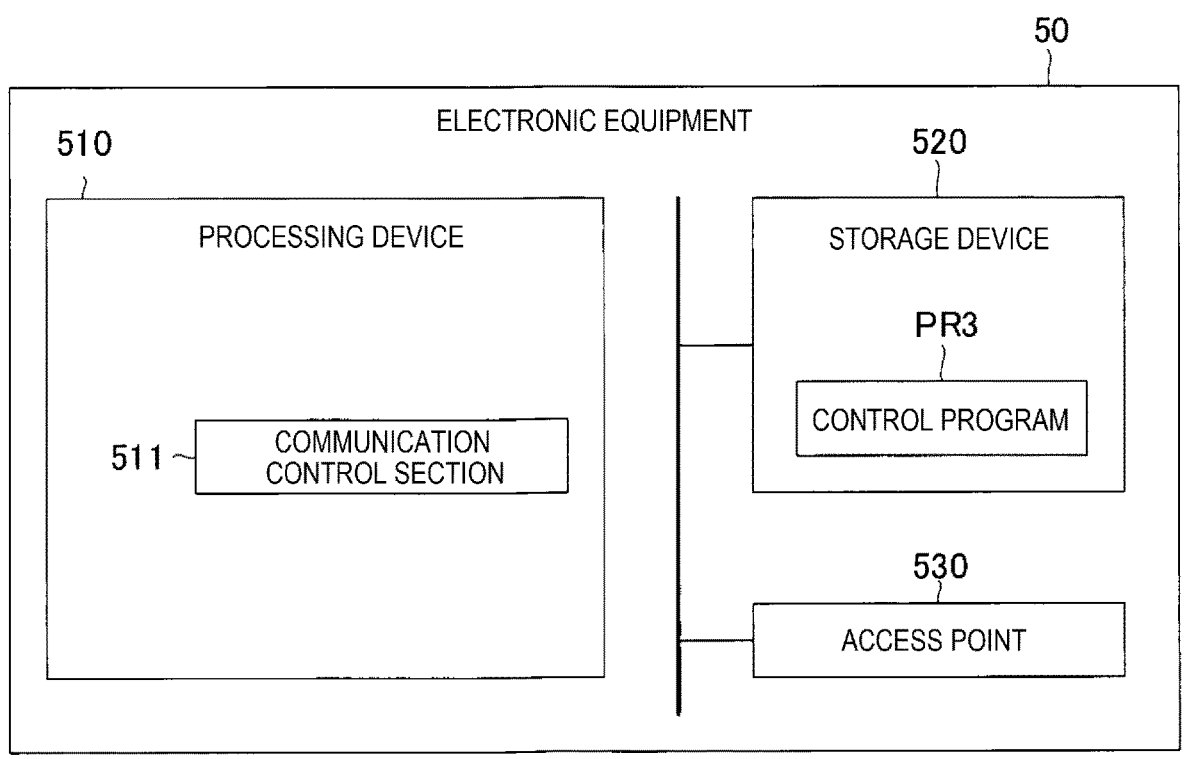
FIG. 7 is a block diagram showing the configuration of electronic equipment.

FIG. 7 is a block diagram showing the configuration of the electronic equipment 50. The electronic equipment 50 includes a processing device 510, a storage device 520, and an access point 530. The components of the electronic equipment 50 are configured by one or a plurality of kinds of equipment. A part of the components of the electronic equipment 50 may be omitted.

The processing device 510 is a processor that controls the entire electronic equipment 50 and is configured by, for example, one or a plurality of chips. The processing device 510 is configured by a central processing unit (CPU) including, for example, an interface with peripheral devices, an arithmetic operation device, and a register. A part or all of functions of the processing device 510 may be realized by hardware such as a DSP (Digital Signal Processor), an ASIC (Application Specific Integrated Circuit), a PLD (Programmable Logic Device), or an FPGA (Field Programmable Gate Array). The processing device 510 executes various kinds of processing in parallel or sequentially.

The storage device 520 is a recording medium readable by the processing device 510 and stores a plurality of programs including a control program PR3 to be executed by the processing device 510. The storage device 520 may be configured by at least one of, for example, a ROM (Read Only Memory), an EPROM (Erasable Programmable ROM), an EEPROM (Electrically Erasable Programmable ROM), and a RAM (Random Access Memory). The storage device 520 may be called register, cache, main memory, main storage device, or the like.

The access point 530 is a communication device for connecting the information processing device 10A, the first projector 30A, and the second projector 30B functioning as wireless LAN clients to one another via the communication network NET using a wireless LAN standard such as Wi-Fi.

The processing device 510 reads out the control program PR3 from the storage device 520 and executes the control program PR3 to thereby function as a communication control section 511. The control program PR3 may be transmitted, via the communication network NET, from another device such as a server that manages the electronic equipment 50.

The communication control section 511 controls mutual communication of the information processing device 10A, the first projector 30A, and the second projector 30B.

2-4. Operation of the Communication Connection System 1A

Figure 8A:
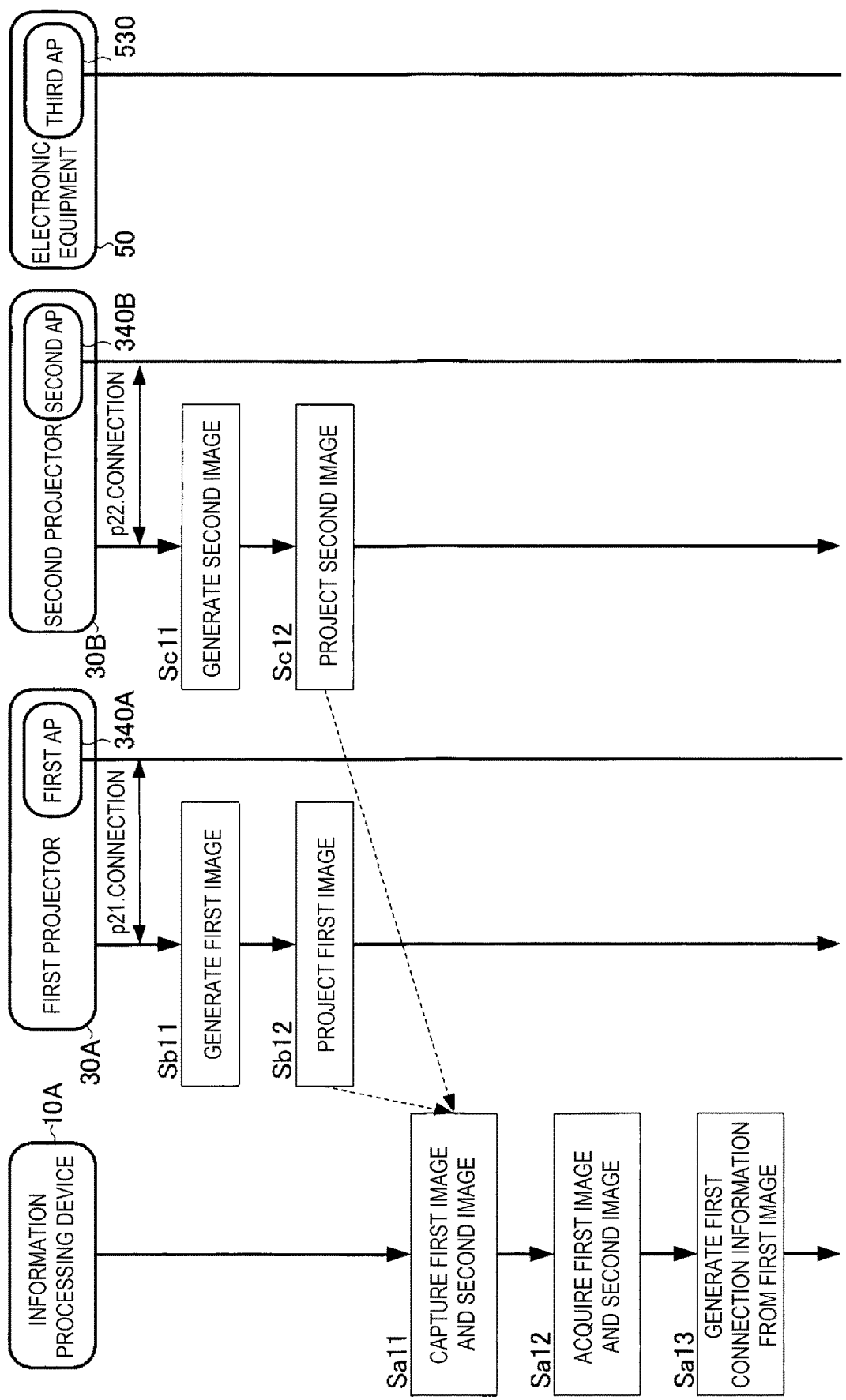
FIG. 8A is a sequence chart showing an example of the operation of the communication connection system.
Figure 8B:
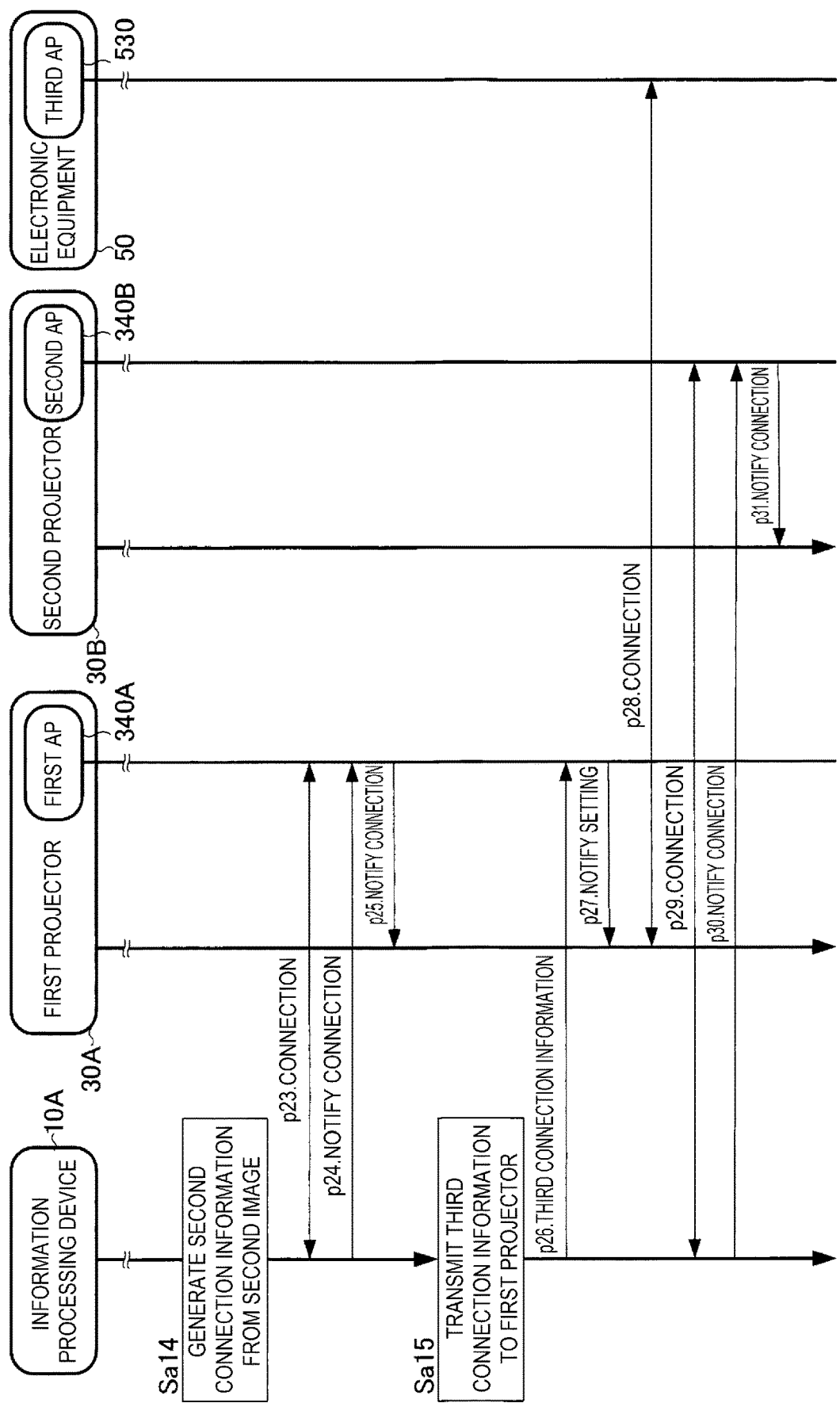
FIG. 8B is a sequence chart showing the example of the operation of the communication connection system.

The operation of the communication connection system 1A is explained. FIGS. 8A to 8C are sequence charts showing an example of the operation of the communication connection system 1A.

As a premise of an operation start, it is assumed that, in the first projector 30A, connection of the processing device 320A and the first access point 340A is established (p21). Similarly, it is assumed that, in the second projector 30B, connection of the processing device 320B and the second access point 340B is established (p22).

First, the image generating section 321A of the first projector 30A generates a first image based on the first connection information c1 (step Sb11) and the projection control section 322A causes the projection device 310A to project the first image onto a wall, a screen, or the like (step Sb12). In parallel to this, the image generating section 321B of the second projector 30B generates a second image based on the second connection information c2 (step Sc11) and the projection control section 322B causes the projection device 310B to project the second image onto the wall, the screen, or the like (step Sc12). Step Sb12 only has to be executed later than step Sb11. Step Sc12 only has to be executed later than step Sc11. Execution order of a set of step Sb11 and step Sb12 and a set of step Sc11 and step Sc12 may be any order.

Subsequently, the imaging device 110 of the information processing device 10A captures a first image and a second image based on operation of the user (step Sa11). At this time, the imaging device 110 may capture the first image and the second image one by one or may collectively capture the first image and the second image.

The first image acquiring section 121 of the information processing device 10A acquires the first image captured by the imaging device 110 and the second image acquiring section 124 of the information processing device 10A acquires the second image captured by the imaging device 110 (step Sa12).

The first connection-information generating section 122 of the information processing device 10A generates the first connection information c1 based on the first image and stores the generated first connection information c1 in the storage device 140 (step Sa13). The second connection-information generating section 125 generates the second connection information c2 based on the second image and stores the generated second information c2 in the storage device 140 (step Sa14). Consequently, the first connecting section 123 establishes connection to the first access point 340A using the first connection information c1 (p23). In response to the establishment of the connection, an application of the information processing device 10A notifies the first access point 340A that the connection is established (p24). The first access point 340A notifies the application of the first projector 30A that the connection is established (p25).

The transmission control section 127 of the information processing device 10A causes the communication device 160 to transmit the third connection information c3 to the first projector 30A (step Sa15). The first access point 340A receives the third connection information c3 (p26). The first access point 340A notifies the application of the first projector 30A that the third connection information c3 is set in the first projector 30A (p27). Consequently, connection between the first projector 30A and the third access point 530 is established (p28).

The second connecting section 126 establishes connection to the second access point 340B using the second connection information c2 (p29). In response to the establishment of the connection, the application of the information processing device 10A notifies the second access point 340B that the connection is established (p30). The second access point 340B notifies the application of the second projector 30B that the connection is established (p31).

The transmission control section 127 of the information processing device 10A causes the communication device 160 to transmit the third connection information c3 to the second projector 30B (step Sa16). The second access point 340B receives the third connection information c3 (p32). The second access point 340B notifies the application of the second projector 30B that the third connection information c3 is set in the second projector 30B (p33). Consequently, connection between the second projector 30B and the third access point 530 is established (p34).

The third connecting section 130 establishes connection to the third access point 530 using the third connection information c3 (p35). In response to the establishment of connection, the application of the information processing device 10A notifies the third access point 530 that connection from the information processing device 10A to the first projector 30A through the third access point 530 is established (p36). The third access point 530 notifies the application of the first projector 30A that the connection is established (p37). Consequently, in the first projector 30A, an image reception mode is started (step Sb13). According to the start of the image reception mode, the first projector 30A notifies, through the third access point 530, the information processing device 10A that the image reception mode is started (p38). The application of the information processing device 10A notifies the third access point 530 that connection from the information processing device 10A to the second projector 30B through the third access point 530 is established (p39). The third access point 530 notifies the application of the second projector 30B that the connection is established (p40). Consequently, in the second projector 30B, the image reception mode is started (step Sc13). According to the start of the image reception mode, the second projector 30B notifies, through the third access point 530, the information processing device 10A that the image reception mode is started (p41). The order of the start of the image reception mode in the first projector 30A and the start of the image reception mode in the second projector 30B may be any order. The notification of the start of the image reception mode from the first projector 30A and the second projector 30B may be executed through the third access point 530 instead of the first access point 340A and the second access point 340B.

Finally, the first transmission control section 128 and the second transmission control section 129 of the information processing device 10A cause the communication device 160 to start transmission of an image stored in the storage device 140. Consequently, an image to be projected by the first projector 30A is transmitted from the information processing device 10A to the processing device 320A of the first projector 30A through the third access point 530. An image to be projected by the second projector 30B is transmitted from the information processing device 10A to the processing device 320B of the second projector 30B through the third access point 530.

As explained above, according to this embodiment, there is provided a communication connection method for connecting the information processing device 10A and the first projector 30A and the second projector 30B, the communication connection method including the information processing device 10A acquiring a first image projected from the first projector 30A and including first connection information c1 necessary for connection via a first communication path, the information processing device 10A acquiring a second image projected from the second projector 30B and including second connection information c2 necessary for connection via a second communication path, and causing the information processing device 10A, the first projector 30A, and the second projector 30B to execute connection based on the acquired first image and the acquired second image.

Further, there is provided a communication connection method including the information processing device 10A extracting first connection information c1 from a first image, the information processing device 10A being connected to the first projector 30A via a first communication path based on the first connection information c1, the information processing device 10A extracting second connection information c2 from a second image, the information processing device 10A being connected to the second projector 30B via a second communication path based on the second connection information c2, while being connected to the first projector 30A via the first communication path, the transmission processing device 10 transmitting third connection information c3 to thereby cause the first projector 30A to execute connection to the information processing device 10A via a third communication path by using the third connection information c3, and, while being connected to the second projector 30B via the second communication path, the transmission processing device 10A transmitting the third connection information c3 to thereby cause the second projector 30B to execute connection to the information processing device 10A via the third communication path by using the third connection information c3.

By projecting the first image representing the first connection information c1, the first projector 30A is capable of communicating the first connection information c1 to the information processing device 10A even if communication with the information processing device 10A is not established. Further, the information processing device 10A is capable of establishing communication with the first projector 30A using the first connection information c1 generated based on the first image.

Similarly, by projecting the second image representing the second connection information c2, the second projector 30B is capable of communicating the second connection information c2 to the information processing device 10A even if communication with the information processing device 10A is not established. Further, the information processing device 10A can establish communication with the second projector 30B using the second connection information c2 generated based on the second image.

In a period in which the information processing device 10A is connected to the first projector 30A, the information processing device 10A transmits the third connection information c3 to the first projector 30A to thereby cause the first projector 30A to execute connection to the electronic equipment 50. In a period in which the information processing device 10A is connected to the second projector 30B, the information processing device 10A transmits the third connection information c3 to the second projector 30B to thereby cause the second projector 30B to execute connection to the electronic equipment 50.

Therefore, even in a state in which communication with the first projector 30A and the second projector 30B is not established, the information processing device 10A can transmit various kinds of information to the first projector 30A and the second projector 30B through the electronic equipment 50.

Accordingly, it is possible to automatically and easily execute connection of one information processing device and a plurality of display devices. Convenience of the user is improved.

3. Modifications

The present disclosure is not limited to the embodiments illustrated above. Specific aspects of modifications are illustrated below. Two or more aspects optionally selected from the following illustrations may be combined.

3-1: Modification 1

The first embodiment and the second embodiment are based on the premise that the mutual connection of the information processing device 10 or 10A, the first projector 30A, and the second projector 30B is the network connection via the communication network NET including the access point. However, the mutual connection is not limited to this. For example, the mutual connection may be one-to-one P2P connection by Ad-hoc communication.

3-2: Modification 2

In the first embodiment and the second embodiment, the first projector 30A and the second projector 30B respectively include the access points 340A and 340B. However, the first projector 30A and the second projector 30B are not limited to this. For example, an access point separate from the first projector 30A and the second projector 30B may be connected to the first projector 30A and the second projector 30B by using a USB terminal. As the access point separate from the first projector 30A and the second projector 30B, for example, a wireless LAN adapter may be used. As a form of the wireless LAN adapter, for example, an extension card, a PC card, or a device of a USB format can be used according to an interface connected to the wireless LAN adapter.

As the wireless LAN adapter, a wireless communication device that includes a plurality of operation modes and operates in a master unit mode in which the wireless communication device operates as the access point or a slave unit mode in which the wireless communication device is connected to another access point as a wireless LAN client may be used. In this case, immediately after the start of the communication connection method disclosed by the present disclosure, that is, at a point in time when step Sb1 or step Sc1 in the first embodiment is performed or a point in time when step Sb11 or step Sc11 in the second embodiment is performed, both of a wireless LAN adapter A, which is a wireless LAN adapter connected to the first projector 30A, and a wireless LAN adapter B, which is a wireless LAN adapter connected to the second projector 30B, are set in the master unit mode. When connection of the information processing device 10 or 10A, the first projector 30A, and the second projector 30B through the wireless LAN adapter A is selected, the master unit mode may be continued as the operation mode of the wireless LAN adapter A to cause the wireless LAN adapter A to function as the access point, the operation mode of the wireless LAN adapter B may be changed to the slave unit mode, and the wireless LAN adapter B may be connected to, as the wireless LAN client, the wireless LAN adapter A functioning as the access point. When receiving the first connection information c1 from the information processing device 10, the wireless LAN adapter B may change the operation mode to the slave unit mode and may be connected to the wireless LAN adapter A based on the received first connection information c1. When receiving the third connection information c3 from the information processing device 10A, the wireless LAN adapter A and the wireless LAN adapter B may change the operation mode to the slave unit mode and may be connected to the access point 530 based on the received third connection information c3.

An IP address may be set in the wireless LAN adapter B of the second projector 30B from the information processing device 10 or 10A when a DHCP mode is off. The projector 30 or the electronic equipment 50 in the network may be operating in the DHCP mode and automatically set an IP address. For example, a command for setting an IP address is notified from the information processing device 10 or 10A to the second projector 30B to set an IP address of the wireless LAN adapter B connected to the second projector 30B.

A flag indicating in which of the master unit mode and the slave unit mode the connected wireless LAN adapter is operating may be included in the connection information included in the QR code. When the wireless LAN adapter is operating in the slave unit mode, the projector 30 connected to the wireless LAN adapter operating in the slave unit mode may project a QR code including, as connection information, an SSID of an access point, which is a connection destination to which the wireless LAN adapter is connected as a wireless LAN client. As a result of the information processing device 10 or 10A acquiring the first QR code C1 and the second QR code C2, when both of the wireless LAN adapter A and the wireless LAN adapter B are in the master unit mode, the information processing device 10 or 10A is connected in the sequence explained above. When both of the wireless LAN adapter A and the wireless LAN adapter B are in the slave unit mode, the information processing device 10A is connected to, using the SSID included in the connection information, the access point, which is the connection destination indicated by the SSID. When one of the wireless LAN adapter A and the wireless LAN adapter B is operating in the master unit mode, the other wireless LAN adapter is operating in the slave unit mode, and the wireless LAN adapter A and the wireless LAN adapter B are using the same SSID, the information processing device 10 may be connected to a relevant access point using the SSID included in the connection information.

In the configuration explained above, the wireless LAN adapter A and the wireless LAN adapter B are separate from the projectors 30. However, the wireless LAN adapter A and the wireless LAN adapter B may be incorporated in the projectors 30.

3-3: Modification 3

In the second embodiment explained above, the electronic equipment 50 functioning as the wireless LAN router including the access point 530 functioning as the third access point is separate from the information processing device 10A, the first projector 30A, and the second projector 30B and connected to the communication network NET. However, the electronic equipment 50 is not limited to this. For example, the access point 530 functioning as the third access point may be connected to the information processing device 10A by using, for example, a USB terminal or the access point 530 may be incorporated in the information processing device 10A.

3-4: Modification 4

In the first embodiment and the second embodiment, the first display device and the second display device correspond to the first projector 30A and the second projector 30B. However, the first display device and the second display device are not limited to a projector. A display device other than the projector may be used. For example, a liquid crystal display, an organic EL (Electro Luminescence) display, a plasm display, a CRT (cathode ray tube) display, and an SED (Surface-conduction Electron-emitter Display) can be used. These display devices may include access points or may be connected to separate access points.

3-5: Modification 5

In the first embodiment and the second embodiment, the information processing device 10 or 10A separately includes the first image acquiring section 121 and the second image acquiring section 124. However, one image acquiring section may be included in the information processing device 10 or 10A and caused to acquire both of the first image representing the first connection information c1 and the second image representing the second connection information c2. The information processing device 10 or 10A separately includes the first connection-information generating section 122 and the second connection-information generating section 125. However, one connection-information generating section may be included in the information processing device 10 or 10A and caused to generate the first connection information c1 based on the acquired first QR code C1 and generate the second connection information c2 based on the acquired second QR code C2. The information processing device 10 or 10A separately includes the first connecting section 123 and the second connecting section 126. However, one connecting section may be included in the information processing device 10 or 10A and connected to the first projector 30A via the first communication path based on the first connection information c1 and, in parallel, connected to the second projector 30B via the second communication path based on the second connection information c2.

3-6: Modification 6

In the second embodiment, at the point in time of the operation start of the communication connection system 1A, the information processing device 10A stores the third connection information c3 and each of the first projector 30A and the second projector 30B does not store the third connection information c3. However, the communication connection system 1A is not limited to this configuration. For example, at the point in time of the operation start of the communication connection system 1A, each of the information processing device 10A and the second projector 30B may not store the third connection information c3 and, on the other hand, the first projector 30A may store the third connection information c3. From a state in which connection to the access point 530 is performed based on the stored third connection information c3, the information processing device 10A, the first projector 30A, and the second projector 30B may be connected through the access point 530. In this case, first, the projection control section 322A causes the projection device 310A to project, onto a wall, a screen, or the like, a first image generated by the image generating section 321A of the first projector 30A based on information indicating that the first projector 30A is already connected to the access point 530 and the third connection information c3. In parallel to this, the projection control section 322B causes the projection device 310B to project, onto the wall, the screen, or the like, a second image generated by the image generating section 321B of the second projector 30B based on the second connection information c2. Subsequently, the imaging device 110 of the information processing device 10A captures, based on operation of the user, the first image projected from the first projector 30A and the second image projected from the second projector 30B. The information processing device 10A generates, from the first image acquired by being captured, the information indicating that the first projector 30A is already connected to the access point 530 and the third connection information c3 and generates the second connection information c2 from the second image acquired by being captured. The information processing device 10A is connected to the second projector 30B through the second access point 340B using the generated second connection information c2. After the connection, the information processing device 10A transmits the third connection information c3 to the second projector 30B to establish connection between the second projector 30B and the third access point 530. The information processing device 10A may establish connection to the third access point 530 using the third connection information c3 to connect the information processing device 10A, the first projector 30A, and the second projector 30B through the access point 530. In this case, the first communication path corresponds to a path passing through the third access point 530.

What is claimed is:

1. A communication connection method comprising:
  acquiring, by an information processing device, a first image displayed by a first display device, the first image representing first connection information for connection via a first communication path;

acquiring, by the information processing device, a second image displayed by a second display device, the second image representing second connection information for connection via a second communication path;

executing communication connection between the information processing device, the first display device, and the second display device based on the first image and the second image;

generating, by the information processing device, the first connection information based on the first image;

connecting, by the information processing device, to the first display device via the first communication path based on the first connection information;

generating, by the information processing device, the second connection information based on the second image;

connecting, by the information processing device, to the second display device via the second communication path based on the second connection information;

transmitting, by the information processing device, third connection information to the first display device while the information processing device is connected to the first display device via the first communication path;

connecting, by the first display device, to the information processing device via a third communication path by using the third connection information;

transmitting, by the information processing device, the third connection information to the second display device while the information processing device is connected to the second display device via the second communication path; and connecting, by the second display device, to the information processing device via the third communication path by using the third connection information.

2. The communication connection method according to claim 1, further comprising:

when the first communication path is selected as a communication path used for connection of the information processing device, the first display device, and the second display device, generating, by the information processing device, the first connection information based on the first image;

connecting, by the information processing device, to the first display device via the first communication path based on the first connection information;

generating, by the information processing device, the second connection information based on the second image;

connecting, by the information processing device, to the second display device via the second communication path based on the second connection information;

transmitting, by the information processing device, the first connection information to the second display device while the information processing device is connected to the second display device via the second communication path; and connecting, by the second display device, to the information processing device via the first communication path by using the first connection information.

3. The communication connection method according to claim 1, further comprising selecting, according to order of the acquisition of the first image and the second image, a communication path used for connection of the information processing device, the first display device, and the second display device from either the first communication path or the second communication path.

4. The communication connection method according to claim 1, further comprising selecting, according to order of the extraction of the first connection information and the second connection information from the first image and the second image, a communication path used for connection of the information processing device, the first display device, and the second display device from either the first communication path or the second communication path.

5. The communication connection method according to claim 1, further comprising selecting, according to operation from user for the information processing device, a communication path used for connection of the information processing device, the first display device, and the second display device from either the first communication path or the second communication path.

6. The communication connection method according to claim 1, further comprising:

acquiring, by the information processing device, model information of the first display device and the second display device; and selecting, according to the model information, a communication path used for connection of the information processing device, the first display device, and the second display device from either the first communication path or the second communication path.

7. The communication connection method according to claim 1, further comprising selecting, based on the first image and the second image, a communication path used for connection of the information processing device, the first display device, and the second display device from either the first communication path or the second communication path.

8. The communication connection method according to claim 1, wherein the third communication path is a communication path passing through an access point included in an external wireless LAN router.

9. The communication connection method according to claim 1, wherein the third communication path is a communication path passing through an access point connected to the information processing device.

10. An information processing device comprising:

at least one processor that executes:

acquiring a first image displayed by a first display device, the first image representing first connection information for connection via a first communication path;

acquiring a second image displayed by a second display device, the second image representing second connection information for connection via a second communication path;

executing communication connection between the information processing device, the first display device and the second display device based on the first image and the second image;

generating, by the information processing device, the first connection information based on the first image;

connecting, by the information processing device, to the first display device via the first communication path based on the first connection information;

generating, by the information processing device, the second connection information based on the second image;

connecting, by the information processing device, to the second display device via the second communication path based on the second connection information;

transmitting, by the information processing device, third connection information to the first display device while the information processing device is connected to the first display device via the first communication path;

connecting, by the first display device, to the information processing device via a third communication path by using the third connection information;

transmitting, by the information processing device, the third connection information to the second display device while the information processing device is connected to the second display device via the second communication path; and connecting, by the second display device, to the information processing device via the third communication path by using the third connection information.

11. A communication connection system comprising:

a first display device configured to display a first image representing first connection information for connection via a first communication path;

a second display device configured to display a second image representing second connection information for connection via a second communication path; and an information processing device configured to acquire the first image and the second image, wherein the information processing device, the first display device, and the second display device execute communication connection based on the first image and the second image by performing:

generating, by the information processing device, the first connection information based on the first image;

connecting, by the information processing device, to the first display device via the first communication path based on the first connection information;

generating, by the information processing device, the second connection information based on the second image;

connecting, by the information processing device, to the second display device via the second communication path based on the second connection information;

transmitting, by the information processing device, third connection information to the first display device while the information processing device is connected to the first display device via the first communication path;

connecting, by the first display device, to the information processing device via a third communication path by using the third connection information;

transmitting, by the information processing device, the third connection information to the second display device while the information processing device is connected to the second display device via the second communication path; and connecting, by the second display device, to the information processing device via the third communication path by using the third connection information.

12. The communication connection system according to claim 11, wherein the first display device includes a first access point, the second display device includes a second access point, the first communication path is a communication path passing through the first access point; and the second communication path is a communication path passing through the second access point.

13. The communication connection system according to claim 11, wherein a first access point is connected to the first display device;

a second access point is connected to the second display device;

the first communication path is a communication path passing through the first access point; and the second communication path is a communication path passing through the second access point.

* * * * *